United States Patent [19]

Doering

[11] Patent Number: 4,689,941
[45] Date of Patent: Sep. 1, 1987

[54] PULLED DETHATCHING UNIT

[75] Inventor: Charles W. Doering, Louisville, Ky.

[73] Assignee: Brinly-Hardy Co., Inc., Louisville, Ky.

[21] Appl. No.: 771,261

[22] Filed: Aug. 30, 1985

Related U.S. Application Data

[63] Continuation of Ser. No. 560,981, Dec. 13, 1983, abandoned.

[51] Int. Cl.[4] ............................................. A01D 76/00
[52] U.S. Cl. ....................................... 56/396; 56/375; 56/17.2; 172/622
[58] Field of Search ..................... 56/17.2, 375, 396; 172/622; 280/186

[56] References Cited

U.S. PATENT DOCUMENTS

| | | | |
|---|---|---|---|
| 2,836,430 | 5/1958 | Langenbacher | 56/17.2 |
| 3,765,159 | 10/1973 | Neff | 56/396 |
| 4,146,096 | 3/1979 | Rocker | 56/375 |
| 4,317,327 | 3/1982 | Doering | 56/396 |
| 4,472,930 | 9/1984 | Smith | 56/396 |

Primary Examiner—John J. Wilson
Attorney, Agent, or Firm—Frank C. Leach, Jr.

[57] ABSTRACT

A pulled dethatching unit includes a frame having a tow bar extending forwardly for attachment to a draw bar of a pulling vehicle. The rear end of the frame has an arm pivotally attached to each side with each arm having a wheel rotatably mounted thereon. The two wheels and the tow bar cooperate so that tines, which are mounted in two rows on the frame for independent movement, do not carry any of the weight of the unit so that the bottom tip of each of the tines is slightly spaced from the ground in its rest position. Each of the tines in each of the rows is offset from each of the tines in the other row. Forward motion of the dethatching unit causes the bottom tip of each of the tines to deflect rearwardly and downwardly as it comes in contact with grass. In their deflected positions, the bottom tips of the tines contact the thatched layer to tear it loose from the soil and alternately flip the thatched layer to fall on the ground. The flipping or release action of the tines occurs periodically as the wheels run over grass clumps or uneven ground. The tow bar includes a curved saddle fitting within an opening in a horizontal plate of the frame so that the angle of the tow bar can be adjustable in accordance with the height of the draw bar to which it is to be attached.

21 Claims, 4 Drawing Figures

PULLED DETHATCHING UNIT

This is a continuation of application Ser. No. 560,981, filed Dec. 13, 1983, now abandoned.

This invention relates to a pulled dethatching unit and, more particularly, to a pulled dethatching unit having the bottom tip of each of its tines slightly spaced from the ground in its rest position.

In U.S. Pat. No. 4,317,327 issued to me, there is shown a pushed dethatching unit. The pushed dethatching unit has the bottom tip of each of the tines spaced from the ground when in the rest position.

In U.S. Pat. No. 4,146,096 to Rocker, there is disclosed a dethatching unit adapted to be pulled by a motive vehicle. The dethatching unit of the aforesaid Rocker patent requires the tines to carry weight so that the tines will penetrate the ground. Thus, the aforesaid Rocker patent seeks to have the tines engage the ground when thatching and to carry weight of the frame on the tines to insure that the tines engage the ground. When at rest, each of the tines of the aforesaid Rocker patent has an upper portion extending slightly forwardly of the vertical and a lower portion extending forwardly of the upper portion.

Another pulled dethatching unit is shown in U.S. Pat. No. 3,756,159 to Neff. The dethatching unit of the aforesaid Neff patent has each of its tines arranged so that its upper portion extends rearwardly and the lower ground engaging portion is vertical in one position. In another position, each of the tines of the dethatching unit of the aforesaid Neff patent has its upper portion extend vertically and the lower ground engaging portion extend forwardly of the upper portion.

The tines of the aforesaid Neff patent carry weight of the frame to insure that the tines penetrate the ground even though there is a pair of wheels supporting the rear end of the frame. It has been suggested that the wheels may be positioned to take part of the weight from the tines.

Because the tines are disposed in the ground when at rest so as to have weight thereon, the dethatching unit of each of the aforesaid Rocker and Neff patents requires a substantial initial force to start pulling of the dethatching unit. Furthermore, the penetration of the tines into the ground tends to cause tearing of the ground so that more than the thatch is usually removed.

The dethatching unit of the aforesaid Neff patent has a hitching bar mounted for adjustment on a hitch support through using a bolt and nut connection. This is to accommodate draw bars of various heights.

The dethatching unit of the aforesaid Rocker patent has a tongue, which is connected to a draw bar of a pulling vehicle, to be adjustable vertically relative to the frame of the dethatching unit. This is for the purpose of causing the bottom ends of the tines to be lower in each succeeding row from the front to reduce the load on the forward row of tines. However, all of the tines of the aforesaid Rocker patent penetrate into the ground.

The pulled dethatching unit of the present invention overcomes the disadvantages of the pulled dethatching units of the aforesaid Rocker and Neff patents in that the bottom tips of the tines are spaced from the ground when at rest. Even though the tines slightly penetrate into the ground when deflected, they do not carry any of the weight of the frame as in the aforesaid Rocker and Neff patents whereby the substantial force required by each of the dethatching units of the aforesaid Rocker and Neff patents to pull the dethatching unit is avoided. Thus, the pulled dethatching unit of the present invention operates with a lower power requirement so as to reduce any excessive loading on a small rider type lawn mower, for example, as could result when the tines run continuously in the ground as occurs with the pulled dethatching unit of each of the aforesaid Rocker and Neff patents.

By the tines of the pulled dethatching unit of the present invention being held off the ground in their free or rest positions, there is less resistance to turning than occurs with the pulled dethatching unit of each of the aforesaid Rocker and Neff patents. When the tines run continuously on the ground as occurs with the pulled dethatching unit of each of the aforesaid Rocker and Neff patents, there is a substantial resistance to turning. The tines of the pulled dethatching unit of the present invention raise up when there is a side thrust to turn the pulled dethatching unit of the present invention so as to free the tines from engagement with the ground if they should have been in engagement therewith.

Because of the flipping action of the tines due to the tines being held off the ground in their free or rest positions, the tines of the pulled dethatching unit of the present invention are more self cleaning than the tines of the pulled dethatching unit of each of the aforesaid Rocker and Neff patents. That is, the tines of the pulled dethatching unit of the present invention flip much more often than do the tines of the pulled dethatching unit of each of the aforesaid Rocker and Neff patents.

The pulled dethatching unit of the present invention also is capable of being utilized with draw bars of various heights through a unique hitching arrangement.

While the pushed dethatching unit of my aforesaid patent has the bottom tips of the tines spaced from the ground when at rest, the pushed dethatching unit cannot be pulled. Thus, the pulled dethatching unit of the present invention is capable of being pulled when such is desired while incorporating the advantages of the pushed dethatching unit of my aforesaid patent.

Because of shipping costs and labor charges in assembly, it is desired to be able to produce a product that may be shipped in a relatively small carton or container and be easily assembled by the ultimate user. The pulled dethatching unit of the present invention meets these requirements. Thus, a relatively lightweight package having a relatively small volume can be used with the pulled dethatching unit of the present invention. The pulled dethatching unit of the present invention may be easily assembled by the user since only screws, bolts, and nuts are employed to complete the assembly.

An object of this invention is to provide a pulled dethatching unit requiring a relatively small force to be pulled.

Another object of this invention is to provide a pulled dethatching unit in which its tines have their bottom tips above the ground when at rest.

A further object of this invention is to provide a pulled dethatching unit that may be shipped in a relatively compact package and easily assembled by the ultimate user.

Other objects of this invention will be readily perceived from the following description, claims, and drawings.

This invention relates to a pulled dethatching unit including frame means having at least two wheels supported adjacent the rear end thereof and on opposite sides of the frame means to support the frame means. Means is supported by the frame means and extends forwardly therefrom for attachment to pulling means to enable pulling of the dethatching unit by the pulling means. The frame means has at least one row of tines mounted thereon with each of the tines being mounted for movement independently of the other of the tines. Each of the tines has a lower portion for engaging the material to be thatched with at least the lower portion of each of the tines being deflectable from about its stationary longitudinal axis in any direction through 360°. The lower portion of each of the tines has its tip above the ground so that no weight is applied to any of the tines when the dethatching unit is at rest.

The attached drawings illustrate a preferred embodiment of the invention, in which.

Figure 1:
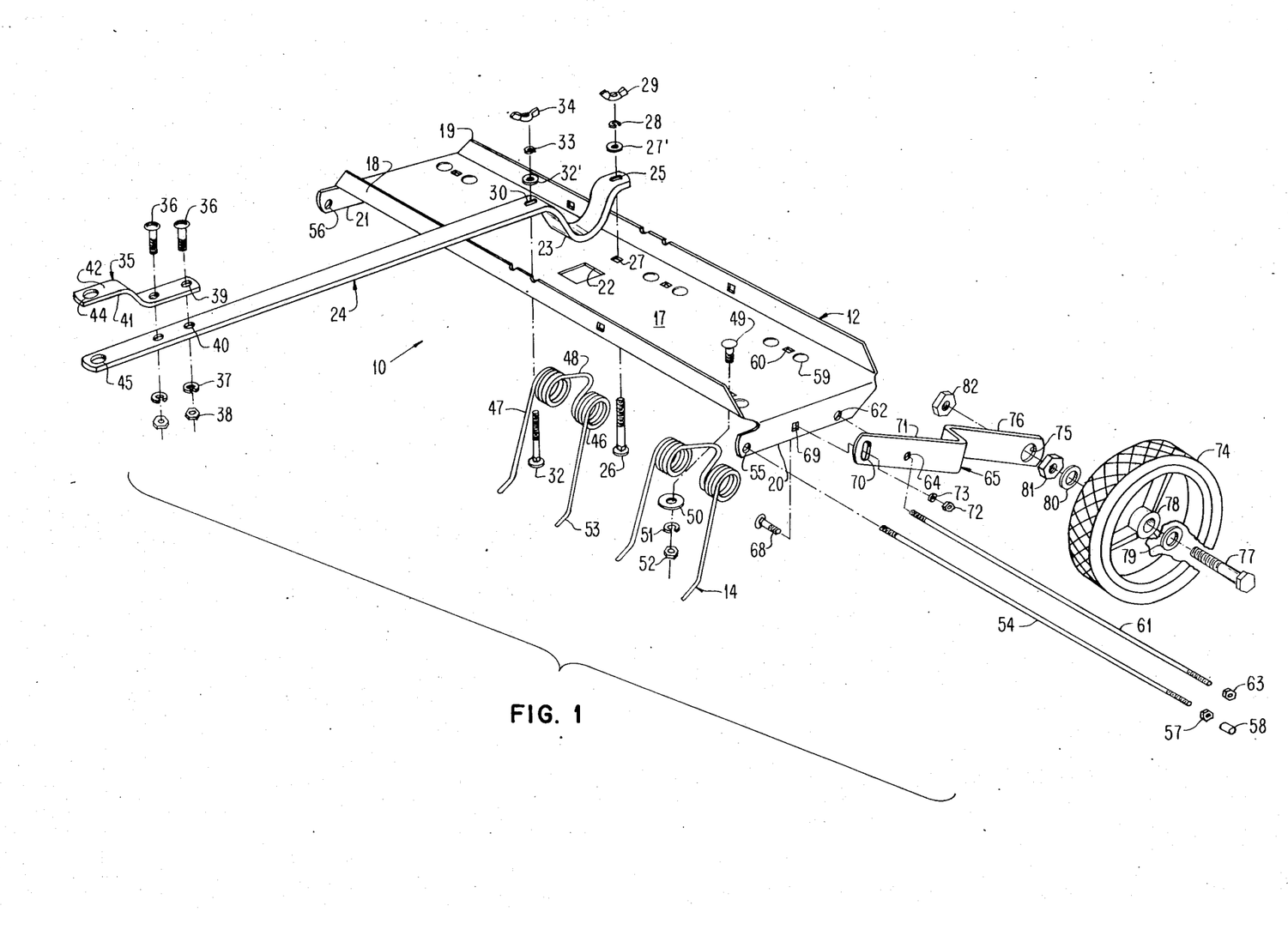
FIG. 1 is an exploded perspective view of portions of a pulled dethatcher of the present invention.

Referring to the drawings and particularly FIG. 1, there is shown a pulled dethatching unit 10 for attachment to a draw bar 11 (see FIG. 2) or the like of a pulling device or vehicle such as a tractor, for example. The dethatching unit 10 includes a frame 12 supporting tines 14 in two substantially parallel rows for engaging material in ground 15 to remove the material. Each of the tines 14 has its bottom tip or end 16 spaced approximately one-quarter inch to one-half inch from the ground 15 when the tine 14 is in its rest position.

The frame 12 includes a substantially flat, horizontally disposed plate 17 having a front wall 18 (see FIG. 1) and a rear wall 19 extending upwardly therefrom and substantially perpendicular thereto. The plate 17 has substantially parallel side walls 20 and 21 extending downwardly therefrom and substantially perpendicular thereto.

The plate 17 of the frame 12 has a square shaped opening 22 therein to receive a curved saddle 23 of a tow bar 24. The tow bar 24 is connected to both the plate 17 of the frame 12 and the draw bar 11 (see FIG. 2).

The tow bar 24 (FIG. 1) has a slotted opening 25 therein rearward of the curved saddle 23 to receive a carriage bolt 26, which passes through a square shaped opening 27 in the plate 17 of the frame 12. After the carriage bolt 26 passes through the square shaped opening 27 in the plate 17, it passes through the opening 25 in the tow bar 24 and then receives a washer 27', a lock washer 28, and a wing nut 29.

The tow bar 24 has a slotted opening 30 therein just forward of the curved saddle 23. The plate 17 of the frame 12 has a second square shaped opening 31 (see FIG. 4), which is in longitudinal alignment with the opening 27 (see FIG. 1), therein to receive a second carriage bolt 32. After the carriage bolt 32 passes through the square shaped opening 31 (see FIG. 4) in the plate 17, it passes through the opening 30 (see FIG. 1) in the tow bar 24 and then receives a washer 32', a lock washer 33, and a wing nut 34. Thus, the tow bar 24 is attached or connected to the frame 12 by the carriage bolts 26 and 32 and the cooperating wing nuts 29 and 34, respectively.

Figure 2:
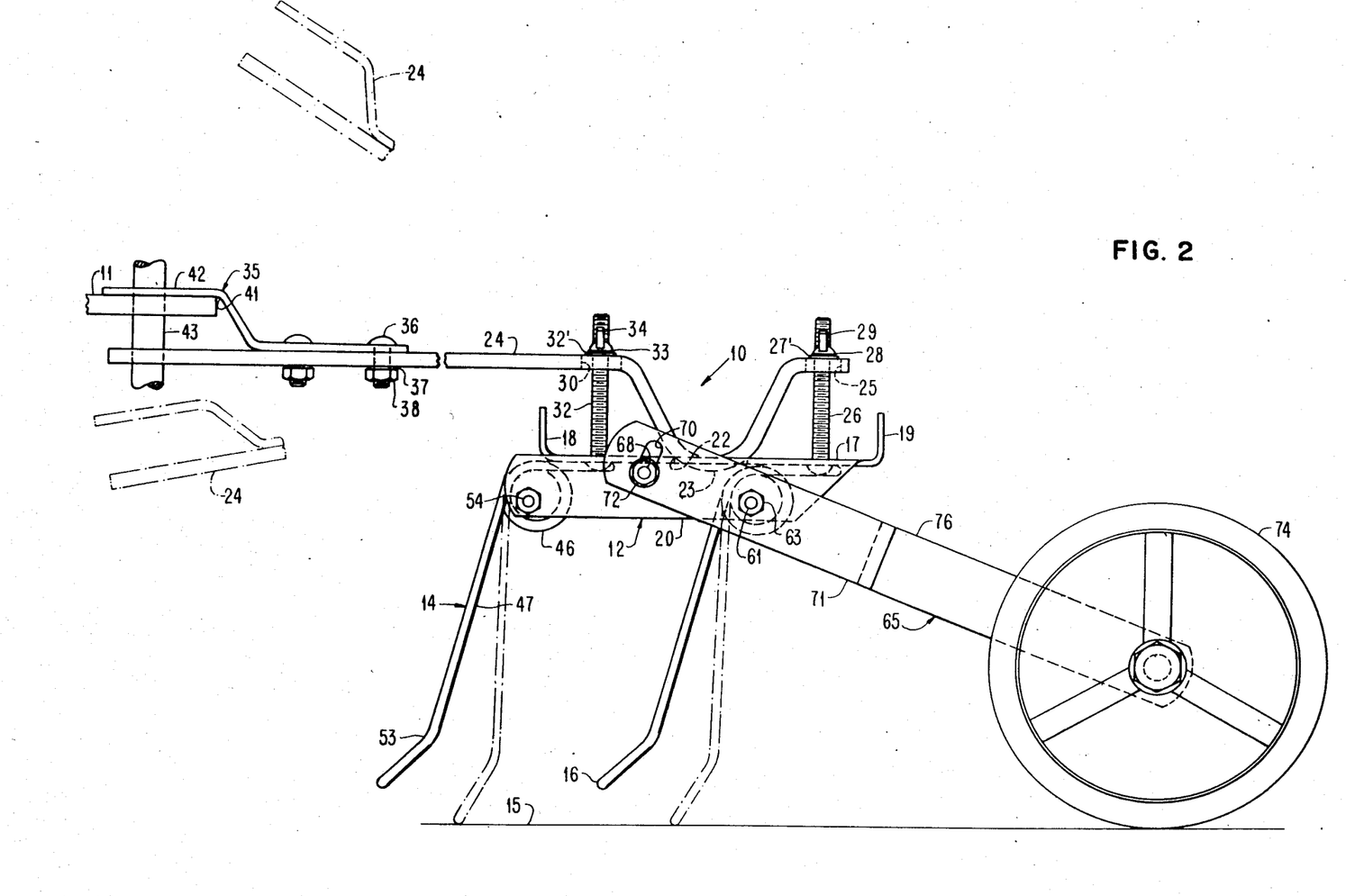
FIG. 2 is a side elevational view of the pulled dethatcher of FIG. 1 and showing it attached to a draw bar of a tractor.

Because each of the slotted openings 25 and 30 is larger than each of the carriage bolts 26 and 32, respectively, the tow bar 24 can be rotated substantially about the center of the radius of curvature forming the curved saddle 23 of the tow bar 24 to position the tow bar 24 at different angles relative to the plate 17. This accommodates substantially different heights of the draw bar 11 (see FIG. 2). The two phantom line positions of the tow bar 24 in FIG. 2 show the maximum up and down positions of the tow bar 24.

The tow bar 24 (see FIG. 1) has a clevis 35 attached to its forward end by screws 36, lock washers 37, and nuts 38. Each of the screws 36 passes through a circular shaped opening 39 in the clevis 35 and a circular shaped opening 40 in the tow bar 24.

The draw bar 11 (see FIG. 2) rests against bottom surface 41 of a portion 42 of the clevis 35. The portion 42 of the clevis 35 is spaced from the tow bar 24 to enable the draw bar 11 to be positioned between the clevis 35 and the tow bar 24. The draw bar 11 is connected to the tow bar 24 and the clevis 35 by a connecting pin 43 extending through a circular shaped opening 44 (see FIG. 1) in the portion 42 of the clevis 35, a circular shaped opening (not shown) in the draw bar 11 (see FIG. 2), and a circular shaped opening 45 (see FIG. 1) in the tow bar 24.

Figure 3:
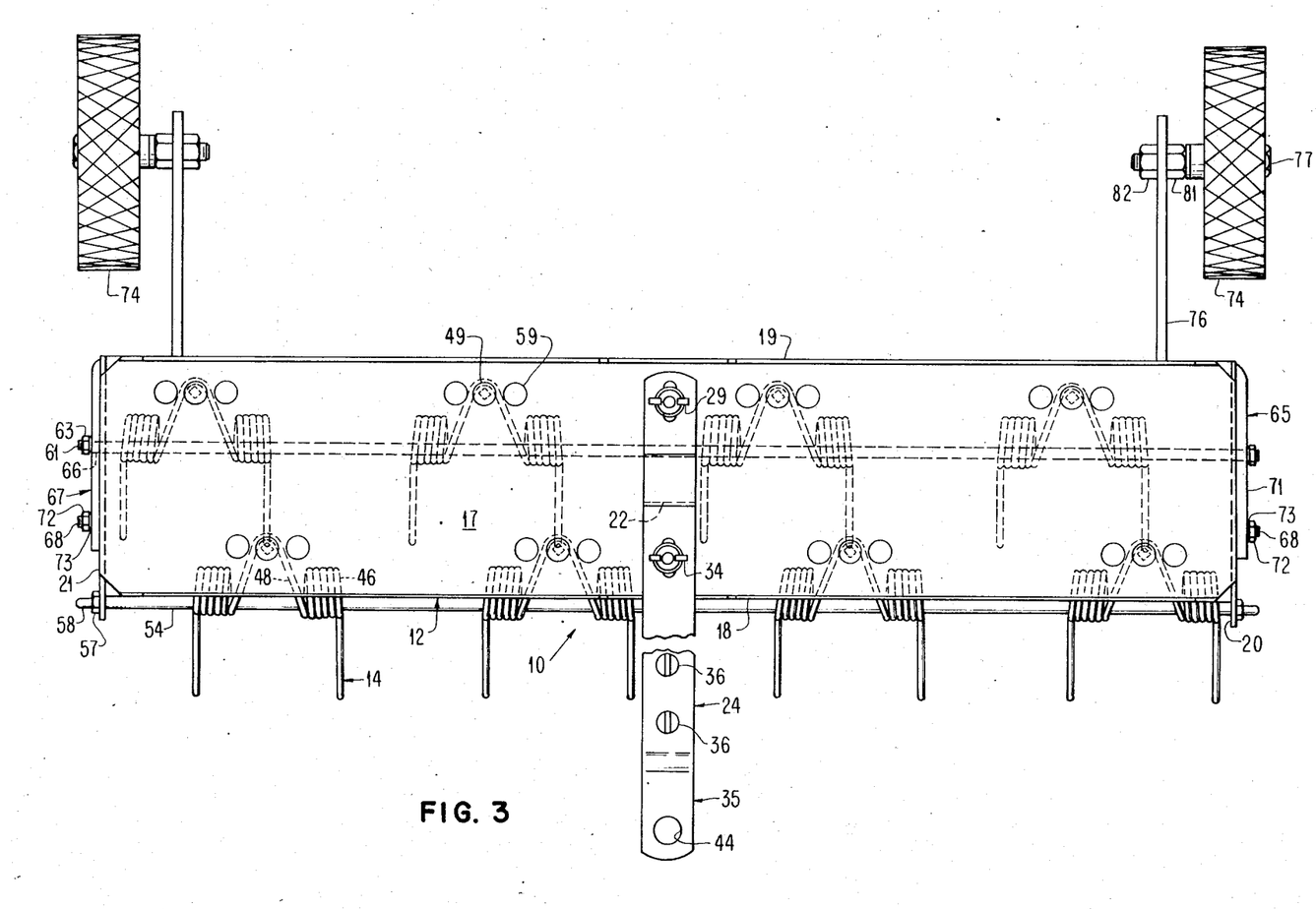
FIG. 3 is a top plan view of the pulled dethatcher of FIG. 1 without the draw bar of the tractor.

As shown in FIG. 3, each of the adjacent pair of the tines 14 in the same row is integral with each other. Each of the tines 14 includes a coiled portion 46 extending substantially horizontally from an upper portion 47 (see FIG. 2) of the tine 14. The coiled portions 46 of the integral adjacent pair of the tines 14 have a connecting portion 48 (see FIG. 1) extending therebetween with the connecting portion 48 being secured to the plate 17 by a carriage bolt 49, a flat washer 50, a lock washer 51, and a nut 52.

This mounting arrangement of the tines 14 enables each of the tines 14 to be movable independently of any of the other of the tines 14. It also enables each of the tines 14 to be deflectable from about its stationary longitudinal axis, which is when the tines 14 are at rest, in any direction through 360°. The coils 46 create a resiliency of the tines 14 that aids in this deflection. This enables each of the tines 14 to pass around clumps of grass by being deflected as the dethatching unit 10 is pulled.

Figure 4:
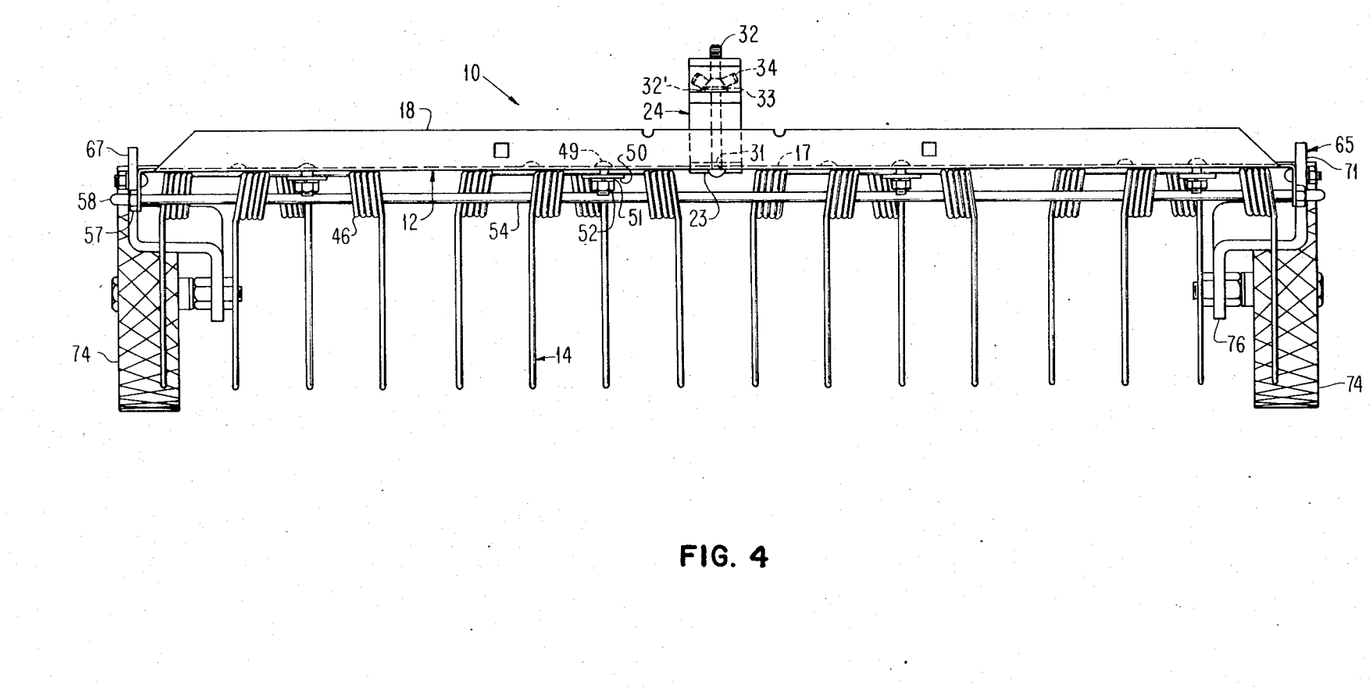
FIG. 4 is a front elevational view of the pulled dethatcher of FIG. 1 without the draw bar of the tractor.

The tines 14 are mounted on the plate 17 of the frame 12 so that the tine 14 in any of the rows (There are two of the rows of the tines 14 shown in FIG. 2 but there could be one row or more than two, if desired.) is offset from each of the tines 14 in any of the other rows as shown in FIGS. 3 and 4. Thus, when one of the tines 14 strikes material to be thatched and has moved rearwardly to the dotted line position of FIG. 2, for example, the tine 14 will not strike any of the tines 14 in the adjacent rearward row. This staggered pattern of the tines 14 also aids passage of the thatched material through the tines 14.

Each of the tines 14 includes a lower portion 53, which engages the material to be thatched, extending forwardly at an angle from the upper portion 47. The upper portion 47 is preferably disposed 15° forwardly of the vertical while the lower portion 53 is disposed 45° forwardly of the vertical and 30° forwardly of the upper portion 47.

Each of the tines 14 is preferably of a diameter in a range of $\frac{1}{8}''$ to 5/32". The length of the lower portion 53 of each of the tines 14 is preferably about 1⅜" while the length of the upper portion 47 from the lower portion 53 to the coiled portion 46 is preferably about 4¾".

As shown in FIG. 4, a rod 54 extends through the coiled portion 46 of each of the tines 14 of the forward row and through aligned circular openings 55 (see FIG. 1) and 56 in the side walls 20 and 21, respectively, of the plate 17 of the frame 12. Each end of the rod 54 is threaded to receive a locking nut 57. A plastic cap 58 fits over the threaded portion of the rod 54 extending beyond the nut 57.

The rod 54 is substantially smaller in diameter than the diameter of the coiled portion 46 of each of the tines 14 and is positioned adjacent the lower portion of each of the coiled portions 46 to enable the tine 14 to bend backwardly to the dotted line position of FIG. 2. The rod 54 prevents any of the tines 14 from flying loose if the tine 14 should break so as to no longer be secured by the bolt 49 (see FIG. 1) and the nut 52.

It should be understood that the plate 17 has a depressed portion 59 (see FIG. 1), which is like a button, adjacent the connecting portion 48 on each side of the bolt 49. As shown in FIG. 1, the centers of the depressed portions 59 are laterally aligned with the centers of square shaped openings 60 for the bolts 49.

A rod 61, which is the same diameter as the rod 54, is positioned within the coiled portion 46 of each of the tines 14 of the rear row of the tines 14 to prevent any of the tines 14 from flying loose if the tine 14 should break so as to no longer be secured by the bolt 49 and the nut 52. The rod 61 extends through aligned circular shaped openings (one shown at 62 in the side wall 20) in each of the side walls 20 and 21 of the plates 17 in the same manner as the rod 46 for the front row of the tines 14. The rod 61 has each end threaded to receive a locking nut 63.

The rod 61 also extends through a circular shaped opening 64 in an arm and a circular spaced opening 66 (see FIG. 3) in an arm 67 and provides a pivot for each of the arms 65 and 67. The arm 65 (FIG. 1) is secured to the side wall 20 of the plate 17 by a carriage bolt 68 extending through a square shaped opening 69 in the side wall 20 and an elongated slot 70, which is larger than the carriage bolt 68, in a portion 71 of the arm 65. The carriage bolt 68 is retained in position by a nut 72 with a washer 73 disposed between the nut 72 and the portion 71 of the arm 65. The arm 67 (see FIG. 3) is similarly secured to the side wall 21. This enables pivoting of each of the arms 65 and 67 separately about the rod 61.

Each of the arms 65 and 67 has a wheel 74 rotatably mounted thereon. As shown in FIG. 1, the arm 65 has a circular shaped opening 75 in a portion 76, which is offset inwardly from the portion 71, to receive a bolt 77, which passes through a hub 78 of the wheel 74 prior to passing through the opening 75. Washers 79 and 80 are disposed on the bolt 77 on opposite sides of the hub 78. Hexagon nuts 81 and 82 are attached to the bolt 77 on opposite sides of the portion 76 of the arms 65 so that the bolt 77 cannot rotate and functions as the axle for the wheel 74. The other of the wheels 74 is similarly rotatably mounted on the arm 67 (see FIG. 3). Thus, as shown in FIGS. 3 and 4, the wheels 74 are outside of the path of all of the tines 14 except for the outermost of one of the tines 14 in the forward row and the outermost of one of the tines 14 in the rear row.

In combination with the vertical adjustment of the tow bar 24 relative to the frame 12, the separate adjustment of each of the arms 65 and 67 through the elongated slot 70 (see FIG. 1) allows both leveling and height control of the tines 14 in the longitudinal direction. By adjusting one of the arms 65 and 67 (see FIGS. 3 and 4) more than the other relative to the frame 12 through the slots 70 (see FIG. 1), height adjustment of the tines 14 is obtained in the lateral direction.

When it is desired to raise the forward end of the tow bar 24, the wing nut 34 on the forward carriage bolt 32 is loosened and the wing nut 29 on the rear carriage bolt 26 is tightened. Lowering of the tow bar 24 is accomplished in the opposite manner by loosening the wing nut 29 on the rear carriage bolt 26 and tightening the wing nut 34 on the forward carriage bolt 32.

The fit of the curved saddle 23 within the square shaped opening 22 in the plate 17 is such that the tow bar 24 is spaced from the upper surface of the front wall 18 of the plate 17 except when the tow bar 24 is in the lower phantom line position of FIG. 2. This enables the curved saddle 23 (see FIG. 1) to always bear against the edges of the opening 22 for support thereby. The maximum lower position of the tow bar 24 is when it engages the top of the wall 18. The maximum upper position of the tow bar 24 is when the rear portion of the tow bar 24 engages the plate 17.

A package for shipping the pulled dethatching unit 10 need not be much bigger than the frame 12. That is, the tow bar 24 has a length less than the plate 17. The wheels 74 also are not larger than the width of the plate 17. The rods 54 and 61 are slightly longer than the plate 17. Accordingly, a relatively small compact package may be utilized to ship the dethatching unit 10 for assembly by the ultimate user. This is approximately one-third of the volume for an assembled dethatcher.

An advantage of this invention is that it reduces the pulling force. Another advantage of this invention is that it is easily packaged in a relatively compact package and easily assembled by the ultimate user. A further advantage of this invention is that it is easily attachable to draw bars of different heights.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A pulled dethatching unit including:
    frame means;
    at least two wheels supported by said frame means adjacent the rear end of said frame means and on opposite sides of said frame means to continuously support said frame means, each of said wheels being independently rotatable;
    means to separately adjust the position of each of said wheels relative to said frame means;
    means supported by said frame means and extending forwardly therefrom for attachment to pulling means to enable pulling of said dethatching unit by the pulling means;
    said frame means having at least one row of tines mounted thereon, each of said tines being mounted for movement independently of each of the other of said tines at all times, each of said tines extending downwardly from said frame means, all of said tines being forward of said wheels;
    each of said tines having a lower portion extending forwardly of the vertical for engaging the material to be thatched during forward motion of said dethatching unit by said lower portion of each of said tines having its tip independently deflected downwardly and rearwardly as it comes in contact with grass so that said tip engages the material to be thatched to tear it loose from the soil and flip the material when said tip is released;

at least said lower portion of each of said tines being deflectable from its stationary longitudinal axis in any direction through 360°;

and said lower portion of each of said tines having its tip above the ground so that no weight is applied to any of said tines when said dethatching unit is at rest.

2. The pulled dethatching unit according to claim 1 including:

a pair of arms pivotally mounted on opposite sides of said frame means;

each of said arms having one of said wheels rotatably supported thereon;

and said separately adjusting means including:
  means to pivotally connect each of said arms to said frame means for independent pivoting of each of said arms;
  and means to lock each of said arms separately in any position to which said arm is pivoted to adjust the plane of the bottom tip of said lower portion of each of said tines.

3. The pulled dethatching unit according to claim 2 in which said supported means includes:

a longitudinally extending bar;

and means cooperating with said bar and said frame means to change the angle of said bar relative to said frame means to accommodate various heights of the pulling means to which said bar is to be connected.

4. The pulled dethatching unit according to claim 2 in which:

said frame means includes a substantially horizontal plate;

said plate has said tines mounted thereon;

said plate has flanges on opposite sides, each of said pair of arms being pivotally mounted on one of said flanges;

and said supported means includes:
  a longitudinally extending bar;
  and means attaching said bar to said plate of said frame means to enable changing of the angle of said bar relative to said plate of said frame means so that the angle of said bar relative to said plate of said frame means is adjustable to accommodate various heights of the pulling means to which said bar is to be connected.

5. The pulled dethatching unit according to claim 1 in which:

said frame means includes a substantially horizontal plate;

said plate has said tines mounted thereon;

and said supported means includes:
  a longitudinally extending bar;
  and means attaching said bar to said plate of said frame means to enable changing of the angle of said bar relative to said plate of said frame means so that the angle of said bar relative to said plate of said frame means is adjustable to accommodate various heights of the portion of the pulling means to which said bar is to be connected.

6. The pulled dethatching unit according to claim 1 in which:

each of said tines having its tip in the single row and each of said tines having its tip in the single row is movable downwardly and rearwardly for engaging the material to be thatched.

7. The pulled dethatching unit according to claim 1 in which said separate adjusting means includes means to infinitely adjust the position of each of said wheels relative to said frame means to infinitely adjust the plane of the bottom tip of said lower portion of each of said tines.

8. A pulled dethatching unit including:

frame means;

at least two wheels supported adjacent the rear end of said frame means and on opposite sides of said frame means to support said frame means;

means supported by said frame means and extending forwardly therefrom for attachment to pulling means to enable pulling of said dethatching unit by the pulling means;

said frame means having at least one row of tines mounted thereon, each of said tines being mounted for movement independently of each of the other of said tines;

each of said tines having a lower portion for engaging the material to be thatched;

at least said lower portion of each of said tines being deflectable from its stationary longitudinal axis in any direction through 360°;

said lower portion of each of said tines having its tip above the ground so that no weight is applied to any of said tines when said dethatching unit is at rest;

a pair of arms pivotally mounted on opposite sides of said frame means;

each of said arms having one of said wheels rotatably supported thereon;

means to pivotally connect each of said arms to said frame means for independent pivoting;

means to lock each of said arms separately in any position to which said arm is pivoted to adjust the plane of the bottom tip of said lower portion of each of said tines;

said supported means including:
  a longitudinally extending bar;
  and means cooperating with said bar and said frame means to change the angle of said bar relative to said frame means to accommodate various heights of the pulling means to which said bar is to be connected;

said frame means including a substantially horizontal plate;

and said cooperating means including:
  said plate of said frame means having an opening therein;
  said bar including a downwardly extending curved saddle for disposition within said opening in said plate of said frame means;
  and means acting between said bar and said plate beyond each end of said curved saddle to enable the angle of said bar relative to said plate to be changed, said acting means attaching said bar to said plate.

9. The pulled dethatching unit according to claim 8 including:

said frame means having said tines mounted thereon to dispose said tips of said tines in a plurality of rows;

and each of said tines having said tips in each of said rows offset in the direction of motion of said dethatching unit from each of said tines having said tips in each of said other rows of said tips.

10. The pulled dethatching unit according to claim 9 in which each of said tines having its tip in at least one of the plurality of rows is movable downwardly and rearwardly for engaging the material to be thatched.

11. The pulled dethatching unit according to claim 9 in which each of said tines is movable downwardly and rearwardly for engaging the material to be thatched.

12. The pulled dethatching unit according to claim 8 in which said acting means includes:

first means extending between said bar and said plate forward of said curved saddle to attach said bar to said plate;

and second means extending said bar and said plate rearward of said curved saddle to attach said bar to said plate.

13. The pulled dethatching unit according to claim 12 in which each of said first means and said second means of said acting means includes a bolt and a nut.

14. The pulled dethatching unit according to claim 8 in which:

said frame means has a plurality of rows of said tines mounted thereon;

each of said tines in each of said rows of said tines is offset in the direction of motion of said dethatching unit from each of said tines in each of said other rows of said tines;

each of said tines has a coiled portion adjacent said frame means;

catching means supported by said frame means and extending through said coiled portion of each of said tines to catch said tine if it breaks;

and said catching means for one of said rows of said tines includes said pivotal connecting means for said arms.

15. The pulled dethatching unit according to claim 8 in which:

each of a plurality of said tines has its tip in a single row;

and each of said tines having its tip in the single row is movable downwardly and rearwardly for engaging the material to be thatched.

16. A pulled dethatching unit including:

frame means;

at least two wheels supported adjacent the rear end of said frame means and on opposite sides of said frame means to support said frame means;

means supported by said frame means and extending forwardly therefrom for attachment to pulling means to enable pulling of said dethatching unit by the pulling means;

said frame means having at least one row of tines mounted thereon, each of said tines being mounted for movement independently of each of the other of said tines;

each of said tines having a lower portion for engaging material to be thatched;

at least said lower portion of each of said tines being deflectable from its stationary longitudinal axis in any direction through 360°;

said lower portion of each of said tines having its tip above the ground so that no weight is applied to any of said tines when said dethatching unit is at rest;

said supported means including:

a longitudinally extending bar;

and means cooperating with said bar and said frame means to change the angle of said bar relative to said frame means to accommodate various heights of the pulling means to which said bar is to be connected;

said frame means including a substantially horizontal plate;

and said cooperating means including:

said plate of said frame means having an opening therein;

said bar including a downwardly extending curved saddle for disposition within said opening in said plate of said frame means;

and means acting between said bar and said plate beyond each end of said curved saddle to enable the angle of said bar relative to said plate to be changed, said acting means attaching said bar to said plate.

17. The pulled dethatching unit according to claim 16 including:

said frame means having said tines mounted thereon to dispose said tips of said tines in a plurality of rows;

and each of said tines having said tips in each of said rows offset in the direction of motion of said dethatching unit from each of said tines having said tips in each of said other row of said tips.

18. The pulled dethatching unit according to claim 17 in which each of said tines having its tip in at least one of the plurality of rows is movable downwardly and rearwardly for engaging the material to be thatched.

19. The pulled dethatching unit according to claim 17 in which each of said tines is movable downwardly and rearwardly for engaging the material to be thatched.

20. The pulled dethatching unit according to claim 16 in which:

each of said tines has a coiled portion adjacent said frame means;

and catching means supported by said frame means and extending through said coiled portion of each of said tines to catch said tine if it breaks.

21. The pulled dethatching unit according to claim 16 in which:

each of a plurality of said tines has its tip in a single row;

and each of said tines having its tip in the single row is movable downwardly and rearwardly for engaging the material to be thatched.

* * * * *

UNITED STATES PATENT AND TRADEMARK OFFICE
CERTIFICATE OF CORRECTION

PATENT NO. : 4,689,941

DATED : September 1, 1987

INVENTOR(S) : Charles W. Doering

It is certified that error appears in the above-identified patent and that said Letters Patent is hereby corrected as shown below:

Column 3, line 48, before "FIG." insert -- see --.

Column 5, line 37, after "arm" insert -- 65 --.

Column 5, line 39, before "FIG." insert -- see --.

Column 8, line 3 should read as follows:

-- each of a plurality of said tines has its tip in a single row; --.

Column 9, line 21, after "extending" insert -- between --.

Signed and Sealed this

Nineteenth Day of January, 1988

*Attest:*

DONALD J. QUIGG

*Attesting Officer*   *Commissioner of Patents and Trademarks*